United States Patent
Murase et al.

(10) Patent No.: US 9,348,459 B2
(45) Date of Patent: May 24, 2016

(54) METHOD FOR INPUTTING CHARACTER AND INFORMATION PROCESSING APPARATUS

(71) Applicant: FUJITSU LIMITED, Kawasaki-shi, Kanagawa (JP)

(72) Inventors: Taichi Murase, Kawasaki (JP); Nobuyuki Hara, Meguro (JP); Atsunori Moteki, Kawasaki (JP); Takahiro Matsuda, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 13/892,607

(22) Filed: May 13, 2013

(65) Prior Publication Data

US 2013/0342463 A1    Dec. 26, 2013

(30) Foreign Application Priority Data

Jun. 21, 2012   (JP) ................ 2012-139567

(51) Int. Cl.
  *G06F 3/048*   (2013.01)
  *G06F 3/041*   (2006.01)
  *G06F 3/023*   (2006.01)
  *G06F 3/0488*  (2013.01)

(52) U.S. Cl.
  CPC ............ *G06F 3/0418* (2013.01); *G06F 3/0233* (2013.01); *G06F 3/04886* (2013.01)

(58) Field of Classification Search
  CPC ........ G06F 3/017; G06F 3/041; G06F 3/0418
  USPC ............................ 715/773; 345/157, 173–178
  See application file for complete search history.

(56) References Cited

U.S. PATENT DOCUMENTS 8,077,983 B2 * 12/2011 Qiu et al. .............. G06F 17/273
                                                   382/229
8,164,576 B2    4/2012 Inoue et al.
(Continued)

FOREIGN PATENT DOCUMENTS

EP    2 383 641 A2 * 11/2011 ............. G06F 3/048
JP    5-289816      11/1993
(Continued)

OTHER PUBLICATIONS

Office Action issued Sep. 16, 2015 in co-pending U.S. Appl. No. 15/282,960.
(Continued)

*Primary Examiner* — Tadeese Hailu
(74) *Attorney, Agent, or Firm* — Oblon, McClelland, Maier & Neustadt, L.L.P.

(57) ABSTRACT

A method for inputting a character executed by a computer that inputs a character, the method includes: obtaining a first pressed position at which the pressing operation has been performed and a first key corresponding to the first pressed position; detecting deletion of a character input using the first key; obtaining, when the deletion is detected, a second pressed position at which a next pressing operation has been performed and a second key corresponding to the second pressed position; determining whether or not a distance between the first pressed position and the second key is smaller than or equal to a threshold; and correcting, when the distance is smaller than or equal to the threshold, a range that is recognized as the second key in the region on the basis of the first pressed position.

8 Claims, 14 Drawing Sheets

(56) References Cited

U.S. PATENT DOCUMENTS

| | | |
|---|---|---|
| 8,223,129 B2 | 7/2012 | Touyamasaki |
| 8,713,433 B1 * | 4/2014 | Ouyang et al. ...... G06F 17/2735 715/261 |
| 9,030,417 B2 * | 5/2015 | Oh ........................... G06F 3/018 345/169 |
| 2005/0169527 A1 * | 8/2005 | Longe et al. ................... 382/177 |
| 2008/0142280 A1 | 6/2008 | Yamamoto et al. |
| 2008/0246742 A1 | 10/2008 | Wang et al. |
| 2008/0259048 A1 | 10/2008 | Touyamasaki |
| 2010/0182260 A1 | 7/2010 | Kiyuna |
| 2010/0259561 A1 * | 10/2010 | Forutanpour et al. ......... 345/660 |
| 2011/0090151 A1 * | 4/2011 | Huang .................. G06F 3/0237 345/168 |
| 2011/0267278 A1 | 11/2011 | Wickström |
| 2013/0285914 A1 * | 10/2013 | Pasquero .............. G06F 3/0237 345/168 |
| 2013/0326395 A1 | 12/2013 | Oh et al. |
| 2014/0168171 A1 | 6/2014 | Oh et al. |

FOREIGN PATENT DOCUMENTS

| | | |
|---|---|---|
| JP | 9-330175 | 12/1997 |
| JP | 2000-66817 | 3/2000 |
| JP | 2003-177847 | 6/2003 |
| JP | 2003-288156 | 10/2003 |
| JP | 2004-341813 | 12/2004 |
| JP | 2009-31913 | 2/2009 |

OTHER PUBLICATIONS

Office Action mailed Dec. 3, 2015 in U.S. Appl. No. 14/282,960.

* cited by examiner

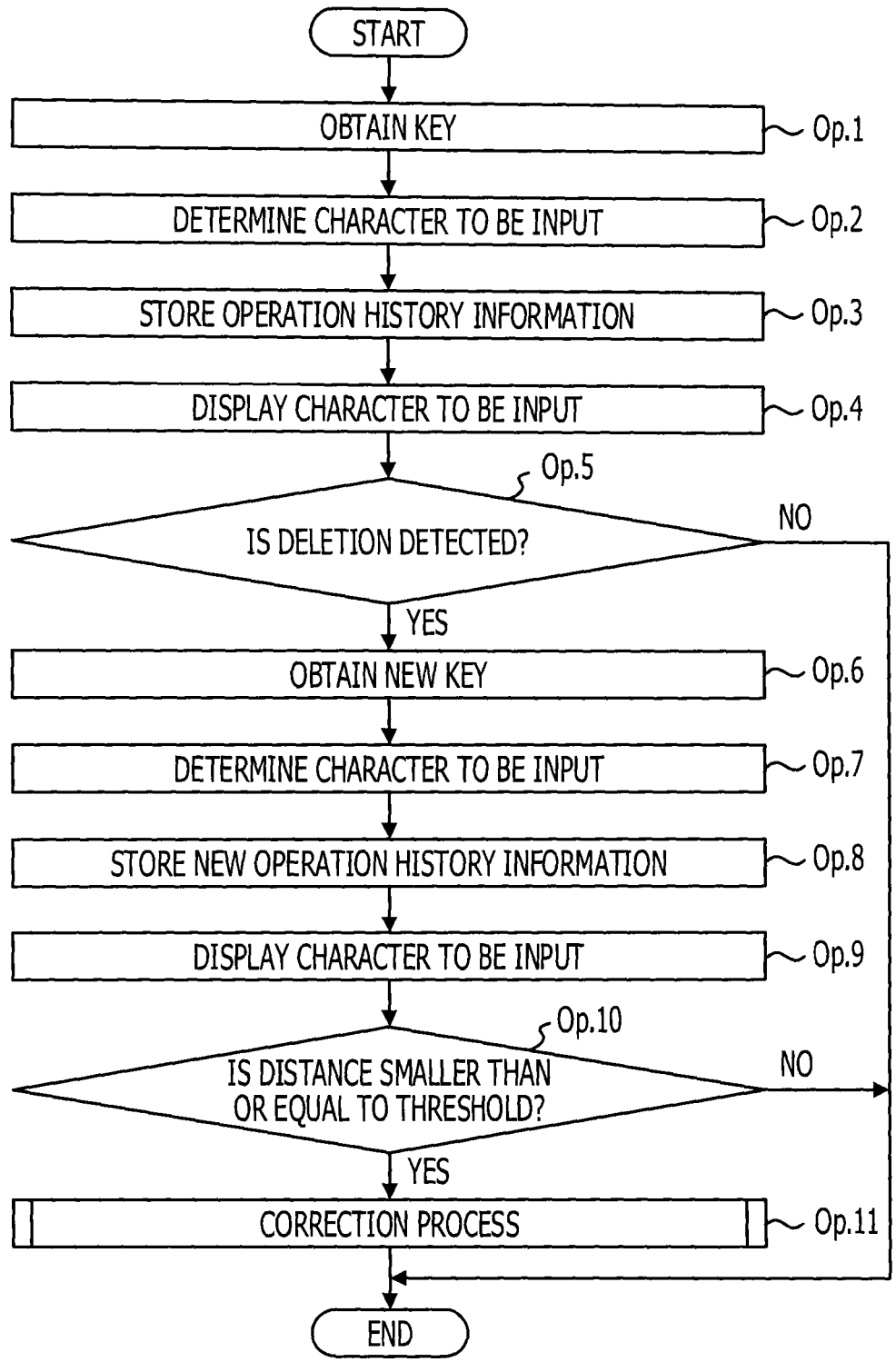

METHOD FOR INPUTTING CHARACTER AND INFORMATION PROCESSING APPARATUS

CROSS-REFERENCE TO RELATED APPLICATION

This application is based upon and claims the benefit of priority from the prior Japanese Patent Application No. 2012-139567 filed on Jun. 21, 2012, the entire contents of which are incorporated herein by reference.

FIELD

The embodiments disclosed herein are related to a technology for controlling input of characters.

BACKGROUND

In these years, the market of keyboardless devices that include no physical keyboards, such as smartphones, slate personal computers (PCs), and tablet devices including iPads (registered trademark), is rapidly expanding. In a keyboardless device, characters are input using a software keyboard as a character input interface. The types of software keyboards include ones in which touch panels are used and ones in which cameras, lasers, or the like are used.

A software keyboard that uses a touch panel displays an image of a keyboard on a touch panel display. The software keyboard then realizes input of a character by detecting a position at which a user has touched the touch panel.

As a software keyboard that uses a camera, a virtual keyboard that uses a camera for capturing an image of an operator's fingers from above and a camera for capturing an image of the operator's fingers from forward is known. For example, such a virtual keyboard is disclosed in Japanese Laid-open Patent Publication No. 2003-288156. The virtual keyboard captures images of the operator's fingers arranged in a plane or the like using the two cameras. The virtual keyboard then compares the position of the operator's finger with reference positions in a Z direction of three-dimensional coordinate axes represented by X, Y, and Z axes, and refers to positional information regarding virtual keys in an XY plane, in order to detect a virtual key intended by the operator.

In addition, unlike a hardware keyboard, a software keyboard can change the arrangement and the sizes of the keys and the like by changing the recognition ranges of the keys. For example, a technology is known in which a keyboard apparatus that uses a touch panel detects an erroneous input of a key by a user on the touch panel and adjusts the input reception range of an arbitrary key in accordance with a result of the detection. For example, such a technology is disclosed in Japanese Laid-open Patent Publication No. 2000-66817.

Upon detecting an input of a correction key such as Delete or Back Space, the keyboard apparatus performs learning using data such as a key code, input coordinates, and displacement from a target key. The keyboard apparatus then adjusts the input reception range of touch of a key on the touch panel.

SUMMARY

According to an aspect of the invention, a method for inputting a character executed by a computer that inputs a character on the basis of a pressing operation performed by a user in a region, the method includes: obtaining a first pressed position at which the pressing operation has been performed and a first key corresponding to the first pressed position; detecting deletion of a character input using the first key; obtaining, when the deletion is detected, a second pressed position at which a next pressing operation has been performed and a second key corresponding to the second pressed position; determining whether or not a distance between the first pressed position and the second key is smaller than or equal to a threshold; and correcting, when the distance is smaller than or equal to the threshold, a range that is recognized as the second key in the region on the basis of the first pressed position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a flowchart illustrating a process for inputting a character according to the first embodiment.

DESCRIPTION OF EMBODIMENTS

When a user is to correct an erroneous input, one of the following two cases occurs. One is a case in which a position pressed by the user is different from the recognition range of a key intended by the user because, for example, the layout of a software keyboard is difficult for the user to use. In this case, the software keyboard identifies an input key on the basis of the position pressed by the user, and determines a character based on the input key. However, the user recognizes that he/she has pressed a key different from the intended key, and then deletes the determined key and tries to press the desired key again.

For example, assume that the position pressed by the user is included in the recognition range of a key to which a character "F" is assigned. The software keyboard determines "F" as a character to be input, but if the user has intended to input a character "G", the user deletes the character "F" and tries to press a key to which the character "G" is assigned.

The other is a case in which the user just presses a wrong key regardless of, for example, how easily the layout of the software keyboard can be used. For example, assume that the software keyboard recognizes pressing of a key to which a character "M" is assigned on the basis of a position pressed by the user. Thereafter, if the user notices that he/she have originally intended to input the character "G" instead of the character "M", the user deletes "M" and inputs "G", which is correct.

Even after detecting an input of a correction key, the keyboard apparatus disclosed in the example of the related art does not distinguish the above two cases. Therefore, the layout after the learning does not necessarily become an appropriate layout.

Accordingly, an object of the technology disclosed herein is to generate the layout of the software keyboard according to the characteristics of the user more appropriately than in the related art.

Embodiments will be described in detail hereinafter. The following embodiments may be combined with one another insofar as the content of processing does not produce contradictions. The embodiments will be described hereinafter with reference to the drawings.

First Embodiment

Figure 1:
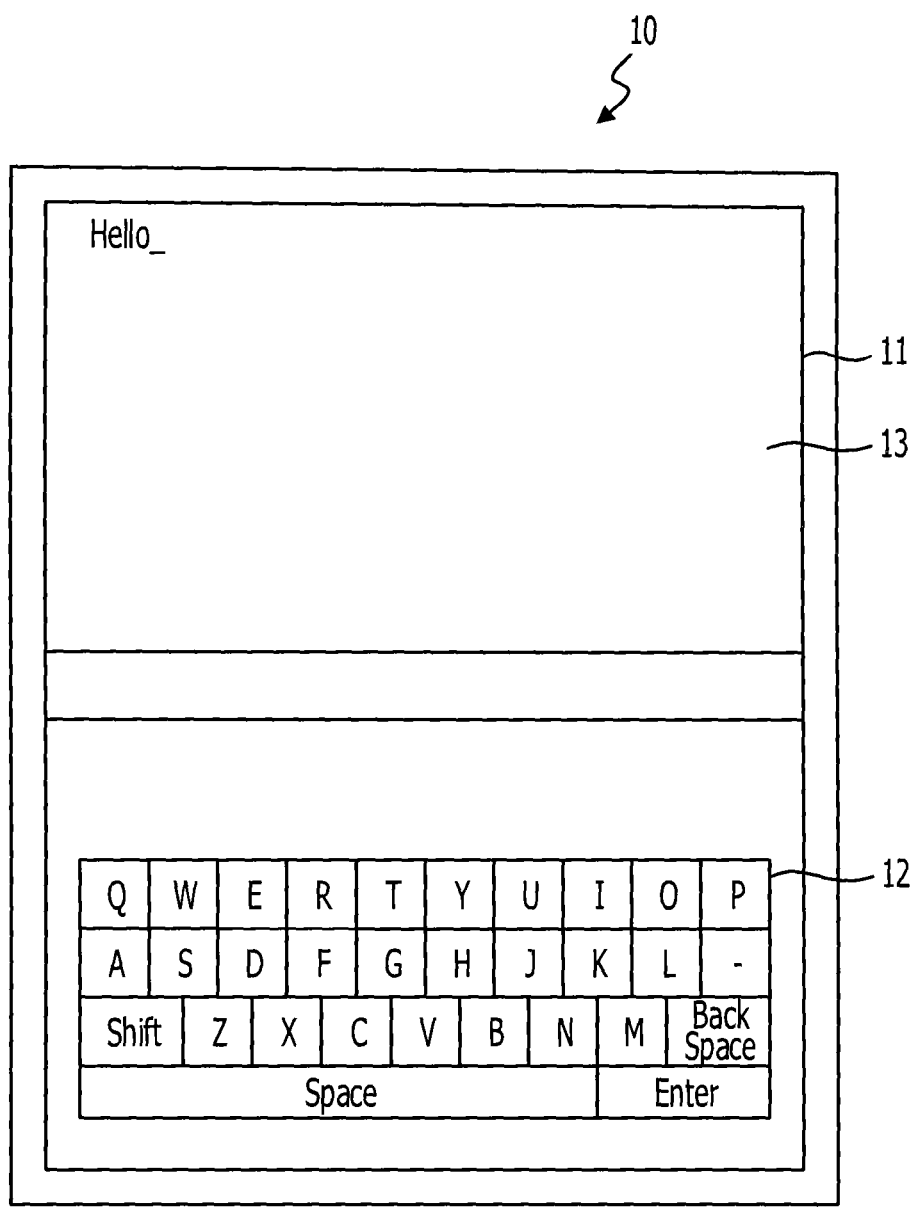
FIG. 1 is a diagram illustrating an example of a mode of using an information processing apparatus 10.

FIG. 1 is a diagram illustrating an example of a mode of using an information processing apparatus 10. For example, the information processing apparatus 10 includes a touch panel 11. The information processing apparatus 10 is a computer, and may be, for example, a smartphone, a slate PC, or a tablet device.

Here, in the example illustrated in FIG. 1, an example of a tablet device including a touch panel is illustrated, the tablet device being an example of the information processing apparatus 10. The technology disclosed in this embodiment is not limited to this, and may be applied to a software keyboard device or the like including a sensor such as a camera or a laser.

The touch panel 11 includes a display device and a position input device. The position input device is a sensor or the like that detects a position on the touch panel 11 at which a pressing operation has been performed. A method for detecting the pressing operation performed on the touch panel may be one of various methods such as, for example, a resistance film method, a capacitance method, a projected capacitance method, and an electromagnetic induction method.

In the example illustrated in FIG. 1, the touch panel 11 includes a keyboard image display region 12 and an input character display region 13. The keyboard image display region 12 is a region in which an image of a keyboard that matches each of various character input modes is displayed. FIG. 1 illustrates an example of an image of a QWERTY keyboard in an alphanumeric input mode.

The input character display region 13 is a region in which characters input by a user are displayed. For example, in the example illustrated in FIG. 1, the input character display region 13 displays a message "Hello_" created by the user using a mailer. The sign "_" indicates the position of a character input cursor.

The information processing apparatus 10 according to this embodiment identifies a key on the basis of a pressed position on the touch panel 11, and determines a character to be input on the basis of the identified key. Furthermore, the information processing apparatus 10 corrects the recognition ranges of keys on the basis of the operation history of the user.

The recognition ranges of the keys are information indicating the ranges assigned to the keys. For example, the information processing apparatus 10 adopting the touch panel 11 sets the recognition ranges of the keys on the basis of the coordinates on the touch panel 11. In addition, in the case of an information processing apparatus that identifies a position pressed by the user by analyzing images obtained by cameras, the recognition ranges of the keys are set on the basis of the coordinates in the images.

More specifically, each recognition range is set on the basis of reference coordinates set for each key. A key having a set of reference coordinates closest to each pixel included in the keyboard image display region 12 among a plurality of sets of reference coordinates is set for each pixel. Among the pixels included in the keyboard image display region 12, a group of pixels whose closest keys are the same configures the recognition range of a key.

When displaying an image of a keyboard on the touch panel 11, the information processing apparatus 10 displays the image of the keyboard such that, for example, a group of pixels whose closest reference coordinates are the same is surrounded by a line, so that the user can visually recognize the recognition ranges of the keys. As a modification, the recognition ranges of the keys may be defined by functions or largest and smallest coordinates.

By correcting the recognition ranges of the keys, the keyboard layout is changed to a layout that reflects the operation history of the user. That is, a keyboard layout according to the characteristics of the user is generated. In this embodiment, "changing the layout" refers to changing the positions of the keys included in the keyboard and changing the sizes of the keys.

Furthermore, in this embodiment, especially the history of correction operations in the operation history of the user is used. A correction operation includes an operation for deleting an input character and a subsequent operation for pressing a key. That is, after a certain character is input in accordance with an operation for pressing a certain key, the certain key is deleted. An operation for pressing a new key is then executed, and a new character is input in accordance with the operation for pressing a new key.

In addition, in this embodiment, a distance between a pressed position before a delete operation and a key input after the delete operation is utilized. The information processing apparatus 10 determines whether or not to correct the reference coordinates of the key input after the correction using the pressed position before the correction. When the reference coordinates of a key are corrected, the recognition range of the key is corrected, and accordingly the entirety of the keyboard layout is changed.

That is, in a process for setting the recognition range on the basis of the reference coordinates of each key, the key having a set of closest reference coordinates among the plurality of sets of reference coordinates changes before and after correction of the reference coordinates of a certain key in some of the pixels included in the keyboard image display region 12. By setting a key having a set of reference coordinates closest to each pixel included in the keyboard image display region 12 among the plurality of sets of reference coordinates for each pixel on the basis of the reference coordinates after the correction, the recognition ranges of the plurality of keys of the keyboard change. Accordingly, the keyboard layout changes.

In this embodiment, by correcting the reference coordinates of the keys, the recognition ranges of the keys are inevitably corrected. In addition, by correcting the reference coordinates of a certain key, the keyboard layout is corrected. When the recognition ranges of the keys are defined as ranges having x and y coordinates in advance, the recognition ranges of the keys are corrected by correcting the ranges having the x and y coordinates.

Figure 2:
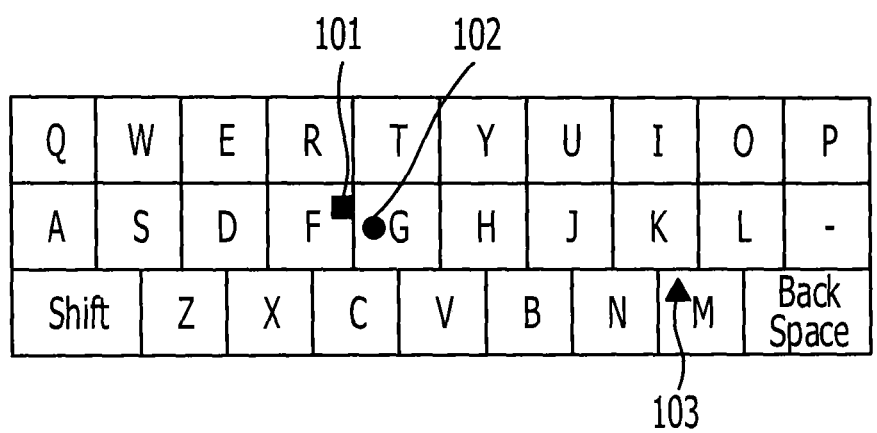
FIG. 2 is a diagram illustrating a correction operation according to a first embodiment.

FIG. 2 is a diagram illustrating the correction operation according to this embodiment. Positions 101, 102, and 103 are positions on the touch panel 11 at which the user has performed pressing operations.

If a distance between a pressed position before a delete operation and a key input after the delete operation is smaller than or equal to a threshold, the information processing apparatus 10 according to this embodiment corrects the recognition range of the key input after the delete operation using the pressed position before the delete operation.

For example, if a distance between a pressed position before a delete operation and the reference coordinates of a key input after the delete operation is smaller than or equal to a threshold, the reference coordinates of the key input after the delete operation are corrected. This is because it can be considered that the user has incorrectly performed a pressing operation because the operability of the recognition range of the key is not satisfactory for the user. Therefore, the information processing apparatus 10 improves the recognition range in accordance with the characteristics of the user by correcting the reference coordinates of the key input after the delete operation.

In a first case, for example, a result of the pressing operation performed by the user, the touch panel 11 of the information processing apparatus 10 detects pressing at the position 102. Upon detecting an operation for deleting an input character "G" corresponding to the position 102, the information processing apparatus 10 deletes the input character "G". Furthermore, after the deletion, the information processing apparatus 10 newly detects pressing at the position 101.

In the first case, a distance between the position 102 and the reference coordinates of the key based on the position 101 is assumed to be smaller than or equal to the threshold. The information processing apparatus 10 corrects the reference coordinates of the key (the key to which a character "F" is assigned) input after the delete operation using the position 102, which is the pressed position before the delete operation. The key to which the character "F" is assigned will be referred to as a key "F" hereinafter. By correcting the reference coordinates of the key "F", the recognition range of the key "F" is corrected.

Here, the information processing apparatus 10 performs correction for moving the reference coordinates of the key "F" close to the pressed position 102 or correction for including the position 102 in the recognition range of the key "F". This is because although the position 102 is included in the recognition range of the key "G" before the correction, it can be assumed that it will become more operable for the user if the position 102 is included in the recognition range of the key "F" because the user has performed the correction operation.

The information processing apparatus 10 does not have to perform the correction for assigning the key "F" input after the delete operation to the position 102 when the user has performed the correction operation once, and may perform the correction on the basis of a plurality of correction operations.

On the other hand, in a second case, for example, as a result of a pressing operation performed by the user, the touch panel 11 of the information processing apparatus 10 detects pressing at the position 103. Upon detecting a delete operation for deleting an input character "M" corresponding to the position 103, the information processing apparatus 10 deletes the input character "M". Furthermore, after the deletion, the information processing apparatus 10 newly detects pressing at the position 101.

The second case in FIG. 2 is a case in which a distance between the position 103 and the reference coordinates of the key based on the position 101 is larger than the threshold. In the second case, the information processing apparatus 10 does not perform a process for correcting the reference coordinates of the key "F" input after the delete operation using the position 103, which is the pressed position before the delete operation. This is because the reference coordinates and the recognition range of the key "F" can be unnecessarily corrected.

It is desirable for the user to improve the keyboard layout on the basis of the correction operation after an incorrect input due to low operability of the keyboard layout. However, the layout does not have to be changed on the basis of the correction operation after an incorrect input that is not strongly related to the operability of the layout. Therefore, by changing the layout on the basis of the correction operation while excluding incorrect inputs that are assumed to be not strongly related to the operability of the layout, the operability of the layout of the software keyboard may be improved.

Figure 3:
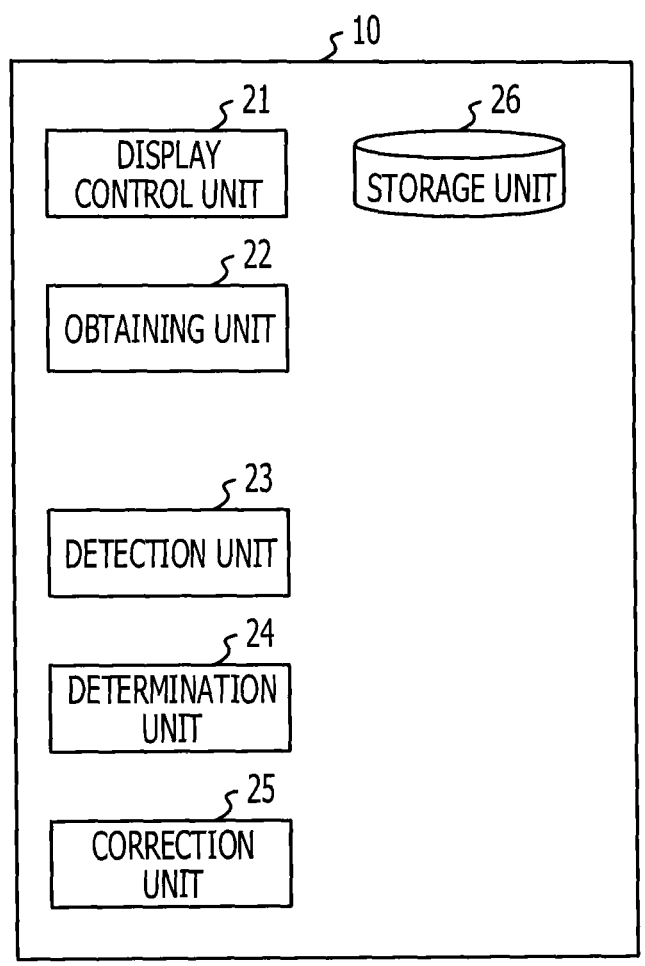
FIG. 3 is a functional block diagram illustrating the information processing apparatus 10.

FIG. 3 is a functional block diagram illustrating the information processing apparatus 10. The information processing apparatus 10 includes a display control unit 21, an obtaining unit 22, a detection unit 23, a determination unit 24, a correction unit 25, and a storage unit 26.

The display control unit 21 displays an image of a keyboard on the touch panel 11. The display control unit 21 displays the image of the keyboard in the keyboard image display region 12 such that the recognition range of each key can be recognized by the user. The display control unit 21 displays a character input through a key operation in the input character display region 13.

For example, the display control unit 21 sets the recognition range of each key on the basis of the reference coordinates of each key and the coordinates of each pixel included in the keyboard image display region 12. The display control unit 21 then displays the image of the keyboard such that the recognition range of each key matches the display range of each key in the keyboard image display region 12.

The obtaining unit 22 obtains a key corresponding to a pressed position. For example, the obtaining unit 22 obtains a pressed position (x and y coordinates) on the touch panel 11 and refers to correspondence information, in order to obtain a key corresponding to the pressed position. The correspondence information is information that defines information regarding the recognition range of each key. An example of the correspondence information is a correspondence table.

For example, the correspondence table stores the reference coordinates of each key as the information regarding the recognition range of each key. The obtaining unit 22 identifies reference coordinates closest to a pressed position on the basis of the reference coordinates stored in the correspondence table. The obtaining unit 22 then obtains a key corresponding to the identified reference coordinates.

The obtaining unit 22 then determines a character to be input on the basis of the obtained key. When a plurality of characters are assigned to each key in accordance with input modes, one of the plurality of characters is determined as the character to be input in accordance with the input mode.

The detection unit 23 detects an operation for deleting an input character. For example, the detection unit 23 detects pressing of a delete key by the user. The delete key is a key for deleting an input character, and may be, for example, a Back Space key or a Delete key.

The determination unit 24 determines whether or not to use a correction operation relating to a detected delete operation in order to correct the recognition range of a key. That is, the determination unit 24 determines whether or not to use a correction operation for changing the keyboard layout.

For example, when the obtaining unit 22 has obtained a key corresponding to a newly pressed position after deletion of a character detected by the detection unit 23, the determination unit 24 calculates a distance between a pressed position in a pressing operation performed for the character that has been detected and the reference coordinates of the newly obtained key.

If the distance is smaller than or equal to the threshold, the determination unit 24 determines that the correction operation is used for correcting the recognition range of the key, and instructs the correction unit 25 to perform the correction. On the other hand, if the distance is larger than the threshold, the determination unit 24 determines that the correction operation is not used for correcting the recognition range of the key.

The correction unit 25 corrects the recognition range of each key on the basis of the result of a determination made by the determination unit 24. For example, a correction unit 25 performs correction such that a pressed position before a delete operation is included in the recognition range of a key input after the delete operation. The correction unit 25 corrects the reference coordinates of the key input after the delete operation using the pressed position before the delete operation. By correcting the reference coordinates, the recognition range of the key is also corrected. The correction unit 25 performs the correction using, for example, [Math. 1] and [Math. 2].

$$x\_ref2\_after = x\_ref1\_after \times A + x\_before \times (1-A)$$ [Math. 1]

$$y\_ref2\_after = y\_ref1\_after \times A + y\_before \times (1-A)$$ [Math. 2]

Here, "x_ref1_after" and "y_ref1_after" denote the reference coordinates of the key input after the delete operation, and reference coordinates before the correction. "x_ref2_after" and "y_ref2_after" denote the reference coordinates of the key input after the delete operation, and reference coordinates after the correction. "x_before" and "y_before" denote the pressed position before the delete operation. A denotes a forgetting factor, and is arbitrarily set within a range between 0 and 1. For example, A is set to 0.7 or the like. The smaller the forgetting factor, the higher the degree of correction in one correction operation.

The reference coordinates of the key input after the delete operation are corrected in such a way as to move close to the pressed position before the delete operation. The recognition range set on the basis of the corrected reference coordinates is likely to be a range including the pressed position, and the likelihood further increases after a plurality of correction operations.

In addition, when the reference coordinates of a certain key have been corrected through correction performed by the correction unit 25, the display control unit 21 sets the recognition range of each key on the basis of the new reference coordinates. That is, the display control unit 21 displays a new image of the keyboard in the keyboard image display region 12 on the basis of the corrected recognition range such that the recognition range of each key can be recognized.

Next, the storage unit 26 stores the correspondence information. For example, the storage unit 26 stores a correspondence table 261 as the correspondence information. The storage unit 26 also stores operation history information.

Figure 4:
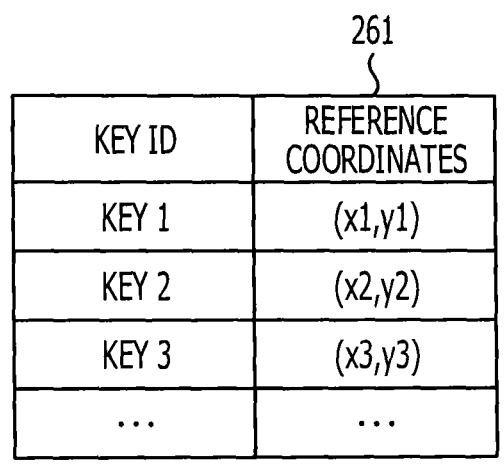
FIG. 4 is a diagram illustrating an example of the data structure of a correspondence table.

FIG. 4 is a diagram illustrating an example of the data structure of the correspondence table 261. The correspondence table 261 is stored in the storage unit 26. The correspondence table 261 stores a key ID and reference coordinates for each key while associating the key ID and the reference coordinates with each other.

The key ID is information for identifying each key. Alternatively, the correspondence table 261 may also store characters assigned to each key identified by the key ID in accordance with the input modes. For example, the correspondence table 261 may associate a key ID "key 1" with "a" in a Japanese input mode and "Q" in the alphanumeric input mode, and store the key ID and the characters.

The reference coordinates are coordinates that serve as a reference for determining the recognition range of each key. For example, the recognition range of the key whose key ID is "key 1" is set using reference coordinates (x1, y1) as a reference.

Figure 5A:
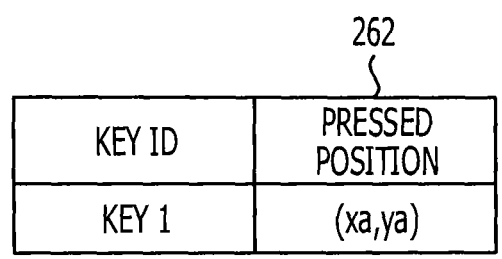
FIGS. 5A and 5B are diagrams illustrating examples of the data structure of operation history information.
Figure 5B:
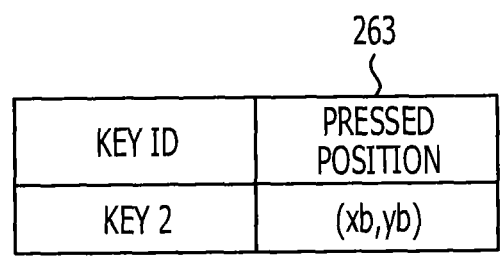

FIGS. 5A and 5B are diagrams illustrating examples of the data structure of the operation history information. The operation history information is stored in the storage unit 26. The operation history information is information including a pressed position obtained by the obtaining unit 22 and the key ID of a key corresponding to the pressed position.

As the operation history information, in this embodiment, operation history information regarding a latest operation is stored. However, when a delete operation has been detected, operation history information regarding a pressing operation immediately before the delete operation and operation history information regarding a pressing operation after the delete operation are stored. Operation history information regarding all key pressing operations may be stored along with time information.

For example, operation history information 262 illustrated in FIG. 5A indicates that the obtaining unit 22 has obtained a pressed position (xa, ya) and the key ID "key 1" of a key corresponding to the pressed position by a certain key pressing operation. Operation history information 263 illustrated in FIG. 5B indicates that the obtaining unit 22 has obtained a pressed position (xb, yb) and a key ID "key 2" of a key corresponding to the pressed position by a key pressing operation performed after a delete operation.

When a delete operation has been detected, the determination unit 24 may determine whether or not to use a correction operation in order to correct the recognition range of a key on the basis of the operation history information before and after the delete operation. A pressing operation corresponding to the delete operation is not stored as operation history information, but may be stored as operation history information.

FIG. 6 is a flowchart illustrating a process for inputting a character according to the first embodiment. Although a correction process is performed during the process for inputting a character in this embodiment, the process for inputting a character and the correction process may be independently performed in terms of time. Prior to the flowchart of FIG. 6, the display control unit 21 displays an image of the keyboard in the keyboard image display region 12 of the touch panel 11 on the basis of the correspondence information.

First, the obtaining unit 22 obtains a key corresponding to a pressed position (Op. 1). For example, the obtaining unit 22 refers to the correspondence table 261, and obtains a key ID corresponding to reference coordinates closest to the pressed position. The obtaining unit 22 determines a character to be input in accordance with the input mode on the basis of the obtained key (Op. 2).

The obtaining unit 22 stores operation history information including the pressed position and the key ID of the obtained key in the storage unit 26 (Op. 3). The order in which Op. 2 and Op. 3 are performed may be reversed. Furthermore, the display control unit 21 displays the determined character to be input in the input character display region 13 of the touch panel 11 (Op. 4). The order in which Op. 3 and Op. 4 are performed may be reversed.

Next, if the detection unit 23 has detected a delete operation (YES in Op. 5), the obtaining unit 22 waits until a new pressing operation is detected, and then obtains a new key corresponding to a pressed position in the new pressing operation (Op. 6). The obtaining unit 22 determines a character to be input on the basis of the obtained key (Op. 7). The obtaining unit 22 newly stores operation history information including the pressed position and the key ID of the obtained key in the storage unit 26 (Op. 8). Furthermore, the display control unit 21 displays the determined character to be input in the input character display region 13 of the touch panel 11 (Op. 9). The order in which Op. 7 and Op. 8 are performed and the order in which Op. 8 and Op. 9 are performed may be reversed.

Next, the determination unit 24 determines whether or not to use the correction operation in order to correct the recognition range of the key on the basis of the operation history information (Op. 10). For example, the determination unit 24 calculates a distance between the pressed position in the pressing operation for the character that has been deleted and the reference coordinates of the key input after the deletion. If the distance is smaller than or equal to the threshold (YES in Op. 10), the determination unit 24 instructs the correction unit 25 to begin a correction process.

The correction unit 25 executes the correction process (Op. 11). Details of the correction process will be described later. The information processing apparatus 10 then ends the process for inputting a character. On the other hand, if the detection unit 23 does not detect deletion (NO in Op. 5) or if the distance is larger than the threshold (NO in Op. 10), the information processing apparatus 10 ends the process for inputting a character.

Figure 7:
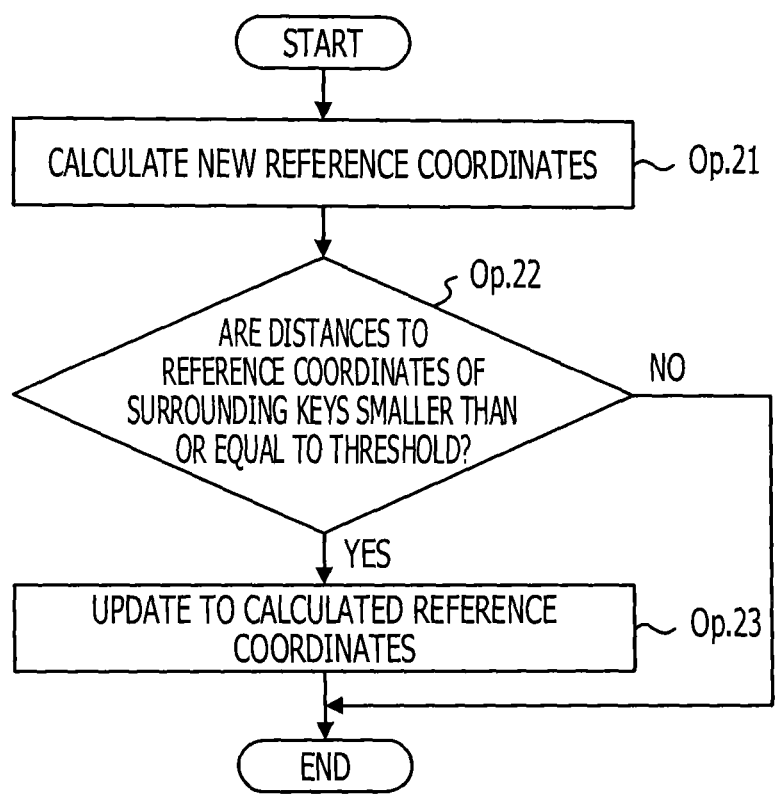
FIG. 7 is a flowchart illustrating a correction process.

FIG. 7 is a flowchart illustrating the correction process. The correction unit 25 corrects the recognition range of a key input after a delete operation on the basis of a pressed position before the delete operation. For example, the correction unit 25 newly calculates the reference coordinates of the key input after the delete operation on the basis of the operation history information, [Math. 1], and [Math. 2] (Op. 21).

The correction unit 25 refers to the correspondence table 261, and determines whether or not distances between the newly calculated reference coordinates and the reference coordinates of keys other than the key input after the delete operation are all smaller than or equal to corresponding thresholds (Op. 22). If the distances are smaller than or equal to the corresponding thresholds (YES in Op. 22), the correction unit 25 updates the reference coordinates of the key input after the delete operation in the correspondence table 261 to the newly calculated reference coordinates (Op. 23). The correction unit 25 then ends the correction process.

On the other hand, if there is a key, the distance to which is larger than the corresponding threshold (NO in Op. 22), the correction unit 25 ends the correction process without updating the reference coordinates of the key input after the delete operation in the correspondence table 261 to the newly calculated reference coordinates. Op. 22 and Op. 23 may be omitted in the correction process.

According to the above-described process, the recognition range of a key may be corrected while excluding incorrect inputs that are assumed to be not strongly related to the operability of the keyboard layout. Therefore, it is possible to generate a keyboard layout with which the operability improves for the user.

Figure 8A:
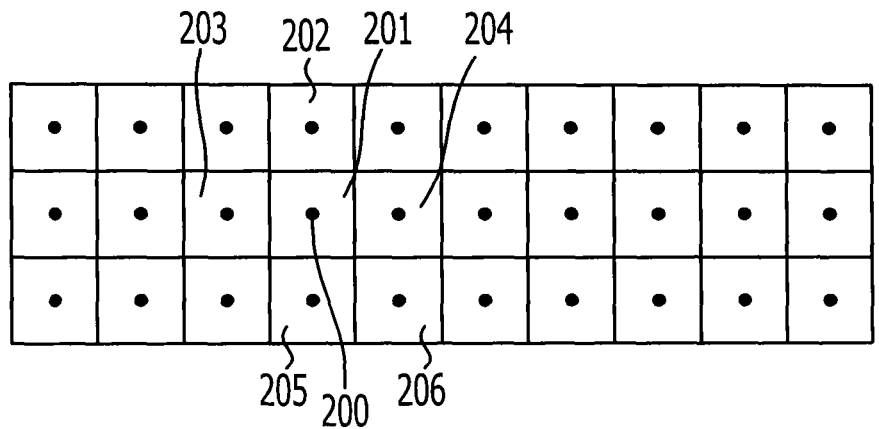
FIGS. 8A and 8B are diagrams illustrating changes in the recognition ranges of keys and a layout.
Figure 8B:
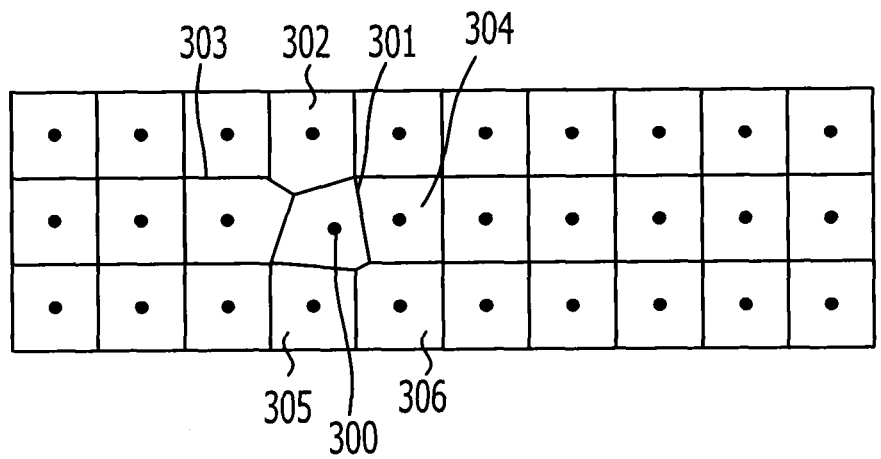

FIGS. 8A and 8B are diagrams illustrating changes in the recognition range of each key and the layout. FIG. 8A illustrates the reference coordinates of each key and a keyboard layout before correction. FIG. 8B illustrates the reference coordinates of each key and a keyboard layout after the correction.

Assume that a key 201 illustrated in FIG. 8A is a key input after a delete operation. The shape of the key 201 indicates the recognition range of the key 201. If reference coordinates 200 are corrected in such a way as to become reference coordinates 300, the recognition range of the key 201 is changed to a range indicated by the shape of a key 301.

Furthermore, the recognition ranges of keys 202 to 206 are changed to ranges indicated by the shapes of keys 302 to 306, respectively. Since the recognition range of each key is set on the basis of distances between the coordinates of each pixel included in the keyboard image display region 12 and the reference coordinates of all the keys after the correction, the recognition ranges of a plurality of keys are changed in accordance with correction of the reference coordinates of a certain key.

For example, in FIG. 2, the position 102 pressed before the correction operation is included in the recognition range of the key "G" before the correction process. However, by performing the correction process according to this embodiment, the position 102 is included in the recognition range of the key "F". Therefore, the information processing apparatus 10 according to this embodiment may provide a software keyboard whose operability is high for the user.

Figure 9:
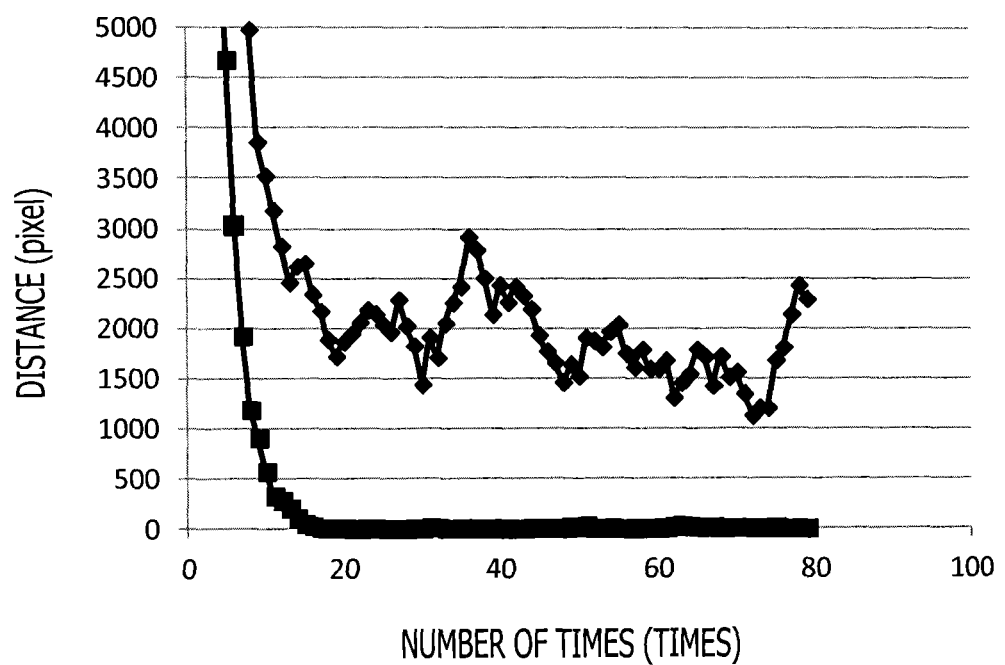
FIG. 9 is a diagram illustrating an advantageous effect produced by the first embodiment.

FIG. 9 is a diagram illustrating an advantageous effect produced by this embodiment. In FIG. 9, the horizontal axis represents the number of correction operations performed. The number of correction operations performed is the same as the number of delete operations performed. The vertical axis represents a distance between reference coordinates and a pressed position. That is, when the distance between reference coordinates and a pressed position is small, it means that the keyboard layout based on reference positions is a layout whose operability is high for the user.

Data indicated by rectangles is a result of an experiment in which the reference coordinates of a certain key were corrected using the method disclosed in this embodiment. Data indicated by lozenges is a comparative example and a result of an experiment in which the reference coordinates of a certain key were corrected on the basis of every correction operation. In the experiments, it was assumed that, as in the second case in FIG. 2, incorrect inputs, in each of which a distance between a pressed position in a pressing operation performed for a character that had been deleted and the reference coordinates of a key input after the deletion was larger than the threshold, occurred at a percentage of 20%.

In the case of this embodiment, it can be seen that the distances between the pressed positions and the reference coordinates of the certain key become smaller after correction is performed a plurality of times. On the other hand, in the comparative example, it can be seen that even if correction is performed a plurality of times, the distances between the pressed positions and the reference coordinates of the certain key are larger than those in this embodiment.

That is, it can be seen that a layout whose operability is high for the user is not obtained when, as in the comparative example, the reference coordinates of a key input after deletion have been corrected using incorrect inputs that are assumed to be not strongly related to the operability of the keyboard layout.

Therefore, as in this embodiment, by excluding incorrect input that are assumed to be not strongly related to the operability of the keyboard layout, a keyboard layout having improved operability for the user may be generated.

Second Embodiment

In a second embodiment, if deletion is not detected (Op. 5 illustrated in FIG. 6) or if the distance between the pressed position in the pressing operation performed for the character that has been deleted and the reference coordinates of the key input after the deletion is not smaller than or equal to the threshold (NO in Op. 10), another correction process is executed.

Figure 10:
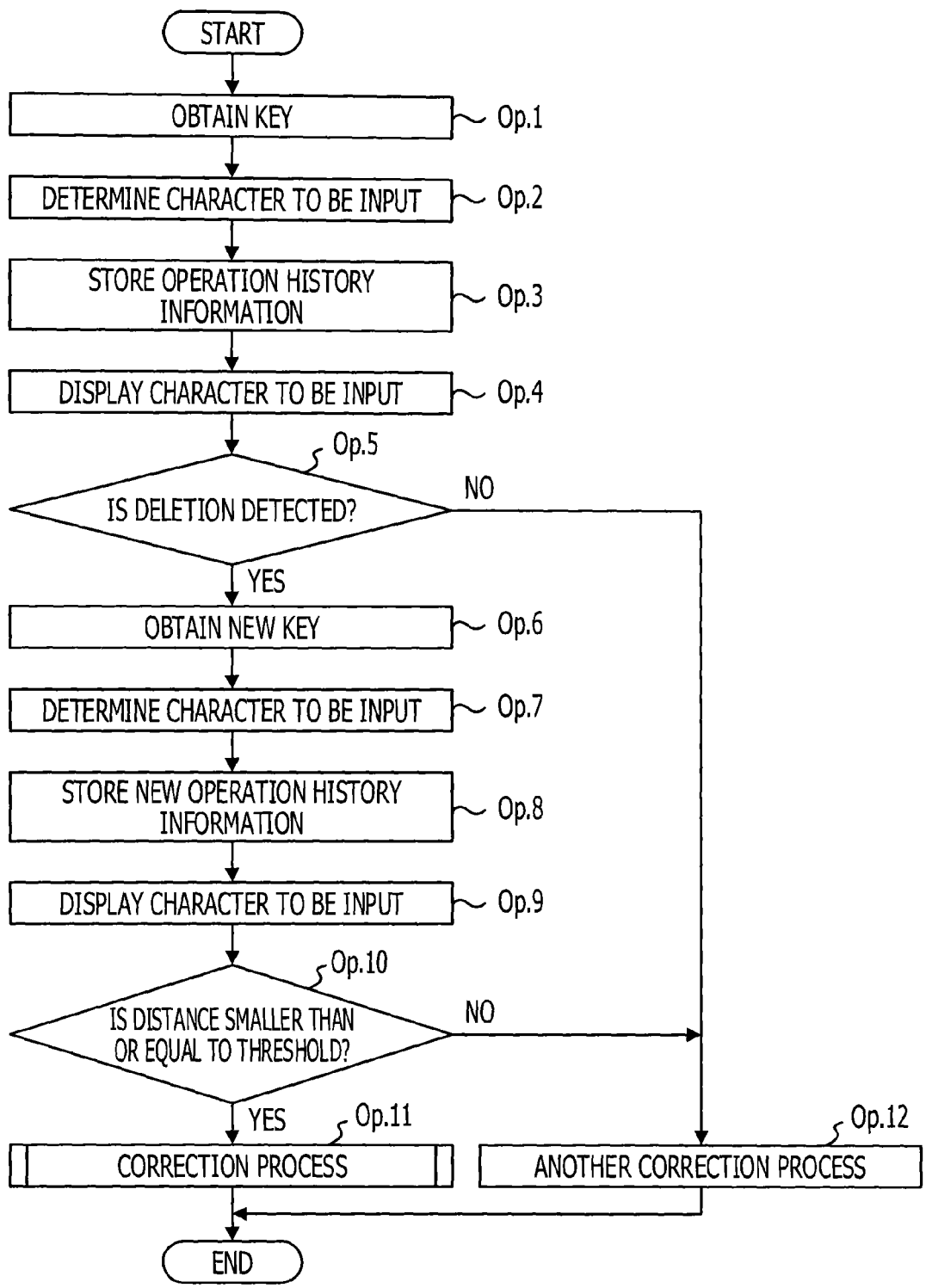
FIG. 10 is a flowchart illustrating a process for inputting a character executed by an information processing apparatus according to a second embodiment.

FIG. 10 is a flowchart illustrating a process for inputting a character executed by an information processing apparatus according to the second embodiment. The same processing as that in the processing flow according to the first embodiment is given the same reference numeral, and accordingly description thereof is omitted. An information processing apparatus 10 according to the second embodiment is represented by the same functional block diagram as that in the first embodiment.

If deletion is not detected (NO in Op. 5), or if the distance is larger than the threshold (NO in Op. 10), the correction unit 25 executes another correction process (Op. 12).

In the other correction process, the correction unit 25 corrects the recognition range of a key input in a latest pressing operation on the basis of a pressed position in the latest pressing operation. For example, the correction is performed using [Math. 3] and [Math. 4].

$$x\_ref2\_previous = x\_ref1\_previous \times B + x\_previous \times (1-B)$$ [Math. 3]

$$y\_ref2\_previous = y\_ref1\_previous \times B + y\_previous \times (1-B)$$ [Math. 4]

Here, "x_ref1_previous" and "y_ref1_previous" denote the reference coordinates of the key input in the latest pressing operation, and reference coordinates before the correction. "x_ref2_previous" and "y_ref2_previous" denote the reference coordinates of the key input in the latest pressing operation, and reference coordinates after the correction. "x_previous" and "y_previous" denote the pressed position in the latest pressing operation. B denotes a forgetting factor, and is arbitrarily set within a range between 0 and 1. For example, B is set to 0.7 or the like. The smaller the forgetting factor, the larger the effect of one correction operation on the correction.

If deletion is not detected (NO in Op. 5), the reference coordinates of the input key are corrected on the basis of the operation history information stored in Op. 3. By correcting the reference coordinates of the input key using a pressed position when a correct pressing operation has been performed, a layout that more completely matches the characteristics of the pressing operations performed by the user may be generated.

If the distance between the pressed position in the pressing operation for the character that has been deleted and the reference coordinates of the key input after the deletion is larger than the threshold (NO in Op. 10), the reference coordinates of the input key are corrected on the basis of the operation history information stored in Op. 8. Alternatively, the reference coordinates of the key input before the deletion may be corrected on the basis of the operation history information stored in Op. 5.

If the distance between the pressed position in the pressing operation performed for the character that has been deleted and the reference coordinates of the key input after the deletion is larger than the threshold, it can be assumed to be an incorrect input that is not strongly related to the operability of the keyboard layout. That is, it can be assumed to be a result input by the user by intention. Therefore, by correcting the reference coordinates of the input key using the pressed position input by the user by intention, a layout that more completely matches the characteristics of the pressing operations performed by the user may be generated.

According to the above-described process, incorrect inputs that are assumed to be not strongly related to the operability of the layout may be excluded in the process for correcting the recognition range of a key input after a delete operation using a pressed position before the delete operation. On the other hand, with respect to incorrect inputs that are assumed to be not strongly related to the operability of the layout and correct inputs, the recognition range of a key input in a latest pressing operation may be corrected using the latest pressing operation. Therefore, a keyboard layout that more completely matches the characteristics of the user may be generated using a large number of operations.

Third Embodiment

In a third embodiment, the threshold used in the determination process performed in Op. 10 is set on the basis of information regarding the user. The information regarding the user includes profile information and information regarding the skill of the user.

An example in which the threshold is set in accordance with skill $\gamma$ of the user will be described hereinafter. The skill $\gamma$ is a value for estimating how much the user is accustomed to using a software keyboard on the basis of the frequency of occurrence of incorrect inputs that are assumed to be related to the operability of the layout.

When the frequency of occurrence of incorrect inputs that are assumed to be related to the operability of the layout is high, it can be assumed that the user is not accustomed to using a software keyboard. On the other hand, the smaller the frequency of occurrence of incorrect inputs, the larger the skill $\gamma$. In addition, the larger the skill $\gamma$, the smaller the threshold.

That is, the determination unit 24 uses a small threshold for a user whose skill $\gamma$ is large in order to more strictly determine incorrect inputs that are assumed to be related to the operability of the layout.

Figure 11:
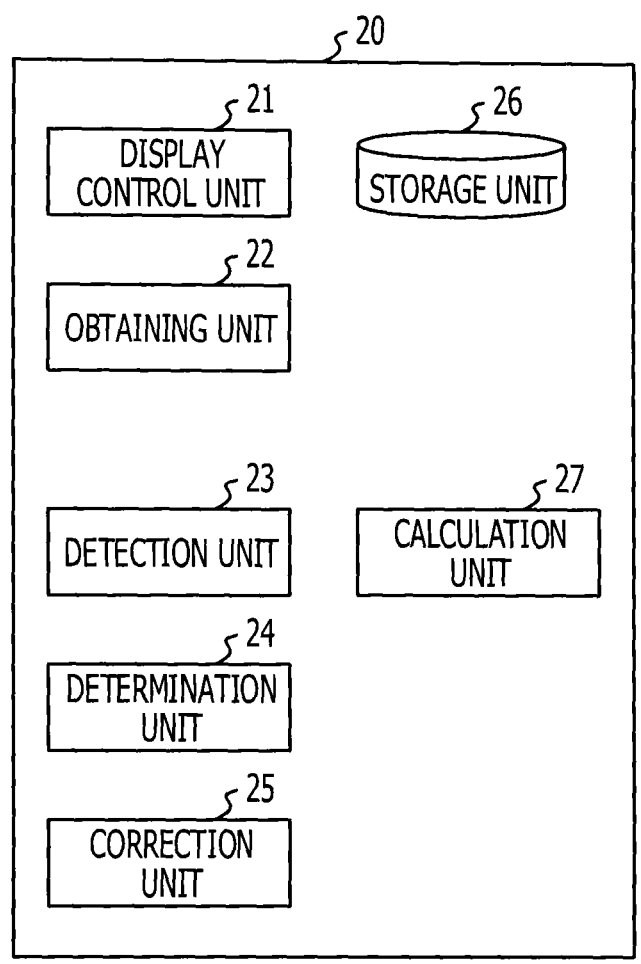
FIG. 11 is a functional block diagram illustrating an information processing apparatus 20 according to a third embodiment.

FIG. 11 is a functional block diagram illustrating an information processing apparatus 20 according to the third embodiment. The information processing apparatus 20 includes a calculation unit 27 in addition to the function units of the information processing apparatus 10 according to the first embodiment.

The calculation unit 27 calculates a threshold Th according to the skill $\gamma$. The determination unit 24 performs the determination process (Op. 10) using the threshold Th generated in the third embodiment. For example, the calculation unit 27 calculates the skill $\gamma$ and a threshold Th_after using the following expressions.

$$\gamma = 1 - (\delta \times M/N)$$ [Math. 5]

$$Th\_after = Th\_before \times (\gamma\_before / \gamma\_after)$$ [Math. 6]

N denotes the number of pressing operations performed in the past. M denotes the number of incorrect inputs that are assumed to be related to the operability of the layout. That is, M denotes the number of delete operations performed in the past, in each of which it is determined that the distance is smaller than or equal to the threshold. M/N denotes the rate of occurrence of incorrect inputs that are assumed to be related to the operability of the layout.

δ denotes an arbitrary adjustment factor, which is set to a value larger than 0 and smaller than N/M. That is, in this embodiment, the calculation unit 27 measures the number of pressing operations performed and the number of incorrect inputs in the process for inputting a character.

Th_after denotes a newly calculated threshold. Th_before denotes a threshold calculated in accordance with past skill. In an initial state, Th_before is a set value. For example, an appropriate value is set in accordance with the size of a display and the number of pixels.

γ_before denotes the past skill. γ_ after denotes new skill. When the threshold Th is to be updated each time an incorrect input that is assumed to be related to the operability of the layout is detected, the skill γ obtained by adding 1 to M and N becomes γ_after, and the skill γ before the addition becomes γ_before in [Math. 5].

The number of inputs in the past may be stored for each user, and the skill γ of each user may be stored. For example, when the information processing apparatus 20 is used by a plurality of users, the skill γ may be stored for each login user. Furthermore, the correspondence table 261 may be stored for each login user. A layout according to the characteristics of each user may be generated.

According to this embodiment, the threshold used for the determination made by the determination unit 24 may be changed in accordance with the skill. Therefore, as the skill of the user becomes higher, a possibility that an incorrect input that is assumed to be not strongly related to the operability of the layout is determined when a correction operation has been performed becomes higher. That is, an incorrect input that is not likely to be valid as a cause to correct the recognition range of a key input after a delete operation on the basis of a pressed position before the delete operation may be excluded to a larger extent.

Figure 12:
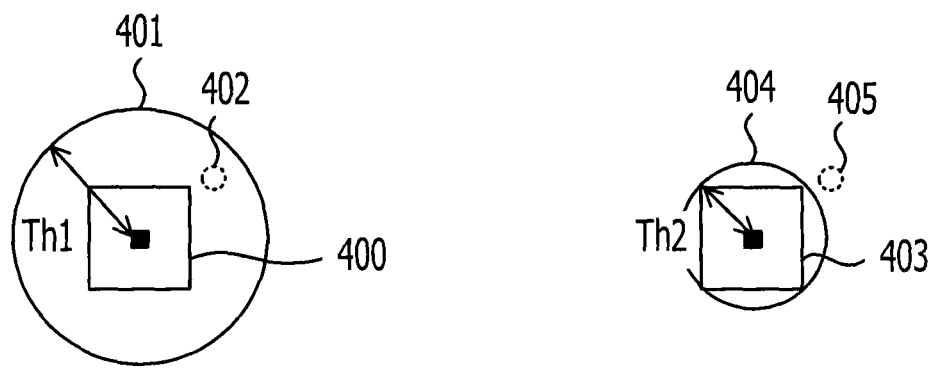
FIG. 12 is a diagram illustrating setting of a threshold according to skill.

FIG. 12 is a diagram illustrating the setting of the threshold according to the skill. When the skill is low, the determination process is performed on the basis of a threshold Th1. If a pressed position before a delete operation is included in a range 401 of a radius Th1 having the reference coordinates of a key 400 input after the delete operation as the center, the reference coordinates of the key 400 are corrected on the basis of the pressed position before the delete operation. For example, in the case of a pressed position 402, correction is performed using the pressed position 402.

On the other hand, when the skill is high, the determination process is performed on the basis of a threshold Th2, which is smaller than the threshold Th1. If a pressed position before a delete operation is included in a range 404 of a radius Th2 having the reference coordinates of a key 403 input after the delete operation as the center, the reference coordinates of the key 403 are corrected on the basis of the pressed position before the delete operation. For example, in the case of a pressed position 405, since the pressed position 405 is not included in the range 404, correction using the pressed position 405 is not performed.

As described above, by setting the threshold Th according to changes in the skill γ, the determination process may be performed more appropriately. When the threshold is to be set on the basis of the profile information, the threshold is set on the basis of the age and the gender of the user and the like. For example, a larger threshold may be set as the age of the user becomes higher.

(Modification)

The above embodiments may be applied to an information processing apparatus other than an information processing apparatus having a touch panel, namely, for example, an information processing apparatus that enables input of characters by setting a virtual keyboard in a place independent of the apparatus.

Figure 13:
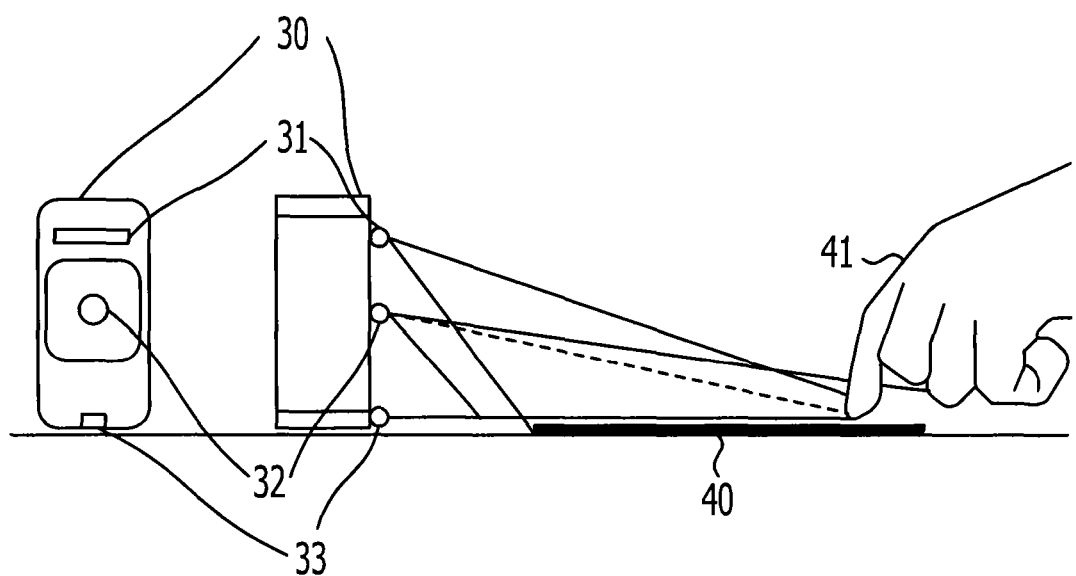
FIG. 13 is a diagram illustrating an example of a mode of using an information processing apparatus 30.

FIG. 13 is a diagram illustrating an example of a mode of using an information processing apparatus 30. The information processing apparatus 30 sets a virtual keyboard 40 in a place independent of the information processing apparatus 30. The information processing apparatus 30 then inputs characters on the basis of operations by a hand 41 performed on the virtual keyboard 40.

The information processing apparatus 30 includes, for example, a projector 31, a sensor 32, and a sensor 33. The projector 31 projects an image of a keyboard on the basis of a keyboard layout. The sensor 32 and the sensor 33 are, for example, charge-coupled device (CCD) sensors or complementary metal-oxide-semiconductor (CMOS) sensors, and capture the images of the hand 41.

The information processing apparatus 30 can identify the three-dimensional position of the hand 41 on the basis of the outputs of the two sensors 32 and 33. The information processing apparatus 30 detects a pressing operation and obtains a pressed position, in order to identify a pressed key.

Furthermore, upon detecting a delete operation, the information processing apparatus 30 corrects the recognition range of a key input after the delete operation using a pressed position before the delete operation. By the correction process, a keyboard layout that takes into account the characteristics of character input performed by the user is generated. Furthermore, an image of a keyboard with which an improvement in the operability is expected is projected by the projector 31.

As another modification, for example, when the reference coordinates of a certain key have been corrected, the reference coordinates of other keys may be corrected on the basis of changes in the reference coordinates before and after the correction. More specifically, the information processing apparatus 10 calculates changes in the reference coordinates of a key that has become a correction target in the x and y coordinates before and after the correction. The information processing apparatus 10 then changes the keyboard layout by changing the reference coordinates of the other keys along the x and y axes.

Figure 14:
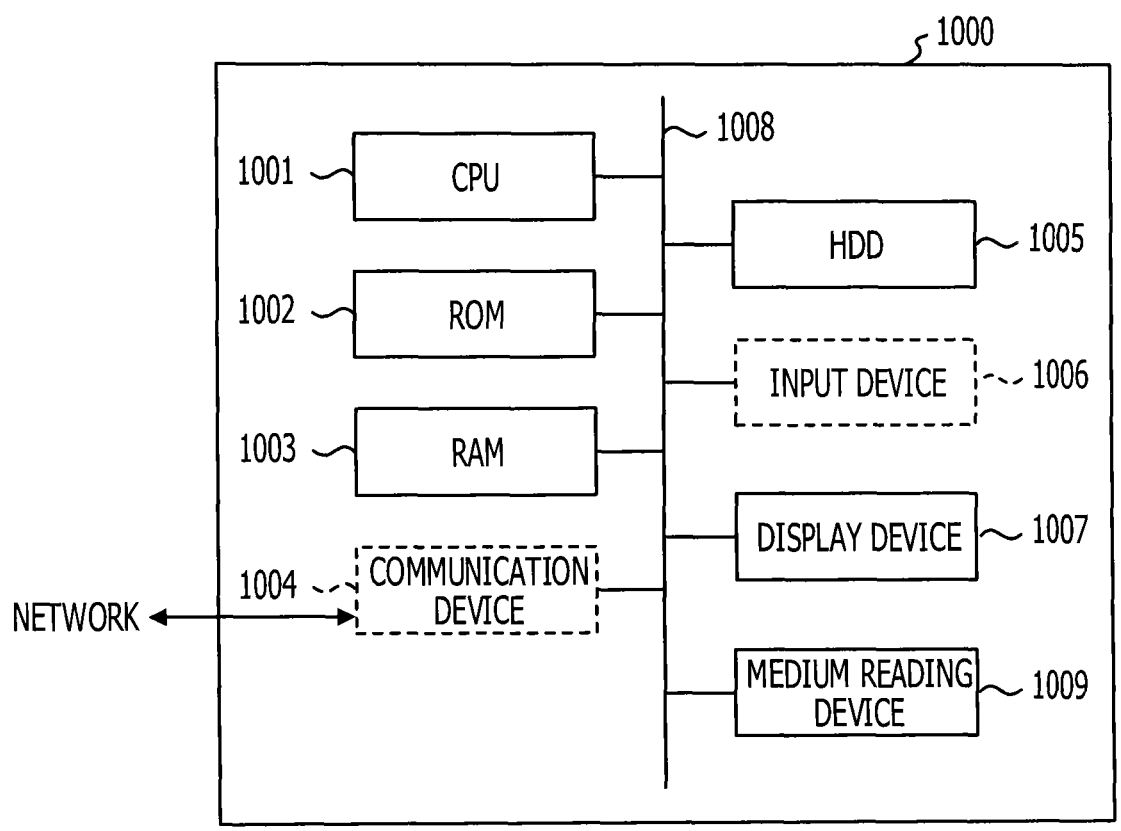
FIG. 14 is a diagram illustrating an example of the hardware configuration of the information processing apparatus 10.

FIG. 14 is a diagram illustrating an example of the hardware configuration of the information processing apparatus 10. The information processing apparatus 20 has the same configuration. A computer 1000 executes the above-described process for inputting a character, and functions as the information processing apparatus 10. The computer 1000 includes a central processing unit (CPU) 1001, a read-only memory (ROM) 1002, a random-access memory (RAM) 1003, a hard disk drive (HDD) 1005, a display device 1007, and a medium reading device 1009. These components are connected to one another through a bus 1008, and can transmit and receive data to and from one another under control of the CPU 1001.

A character input program in which the process for inputting a character and the correction process illustrated in the flowcharts in the above embodiments are described is recorded on a computer-readable recording medium. The computer-readable recording medium may be a magnetic recording device, an optical disk, a magneto-optical recording medium, a semiconductor memory, or the like. The magnetic recording device may be an HDD, a flexible disk (FD), a magnetic tape (MT), or the like.

The optical disk may be a digital versatile disc (DVD), a DVD-RAM, a compact disc read-only memory (CD-ROM), a CD-Recordable (CD-R), a CD-ReWritable (CD-RW), or the like. The magneto-optical recording medium may be a magneto-optical (MO) disk or the like. When this program is to be distributed, for example, portable recording media such as DVDs or CD-ROMs on which this program is recorded may be sold.

When the computer 1000 is to execute the character input program, for example, the medium reading device 1009 reads the program from a recording medium on which the character input program is recorded. Depending on the program read, the computer 1000 may function as the information processing apparatus 10 or the information processing apparatus 20. The CPU 1001 stores the read program in the HDD 1005, the ROM 1002, or the RAM 1003.

The CPU 1001 is a central processing unit that controls the entire operation of the information processing apparatus 10. The HDD 1005 stores, as a program for causing the computer 1000 to realize the same function as that of the information processing apparatus 10 described in the above embodiments, a program for causing the computer 1000 to execute the processes.

The CPU 1001 then reads the character input program from the HDD 1005 and executes the character input program, in order to function as the display control unit 21, the obtaining unit 22, the detection unit 23, the determination unit 24, and the correction unit 25 illustrated in FIG. 3. Furthermore, the CPU 1001 may also function as the calculation unit 27 illustrated in FIG. 11. The character input program may be stored in the ROM 1002 or the RAM 1003 that can access the CPU 1001, instead.

Furthermore, the HDD 1005 functions as the storage unit 26 illustrated in FIG. 3 under control of the CPU 1001. That is, the HDD 1005 stores the information illustrated in FIGS. 4 and 5. As with the program, information corresponding to a data table in the storage unit 26 may be stored in the ROM 1002 or the RAM 1003 that can access the CPU 1001. That is, the data in the storage unit 26 may be stored in a storage device such as the HDD 1005, the ROM 1002, or the RAM 1003. The RAM 1003 also stores information temporarily generated in the course of each process. The display device 1007 displays each screen.

In addition, the computer 1000 that functions as the information processing apparatus 10 may further include a communication device 1004 and an input device 1006. The communication device 1004 receives a signal from another device through a network, and transmits the content of the signal to the CPU 1001. Furthermore, the communication device 1004 transmits a signal to another device through the network in accordance with an instruction from the CPU 1001.

The input device 1006 receives input of information from the user. The input device 1006 may be a physical keyboard, but, in the computer 1000, input of a character is realized by the process for inputting a character disclosed in the embodiments. Alternatively, a touch panel may be adopted by integrating the input device 1006 and the display device 1007 with each other.

Alternatively, as with the information processing apparatus 30, sensors and a projector may be included. Furthermore, a camera having a CCD sensor or a CMOS sensor may be included. The camera captures an image of the user's hand at certain frame intervals, and outputs the captured image to the CPU 1001.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for inputting a character executed by a computer that inputs a character on the basis of a pressing operation performed by a user in a region, the method comprising:
   obtaining a first pressed position at which the pressing operation has been performed and a first key corresponding to the first pressed position;
   detecting deletion of a character input using the first key;
   obtaining, when the deletion is detected, a second pressed position at which a next pressing operation has been performed and a second key corresponding to the second pressed position;
   determining whether or not a distance between the first pressed position and the second key is smaller than or equal to a threshold;
   correcting, when the distance is smaller than or equal to the threshold, a range that is recognized as the second key in the region on the basis of the first pressed position; and
   calculating the threshold in accordance with information regarding the user, wherein
   the correcting is executed on the basis of the calculated threshold, and
   the calculating includes calculating the threshold on the basis of a ratio of the number of times in the past that it is determined that the distance is smaller than or equal to a past threshold to the number of pressing operations performed by the user in the past.

2. The method for inputting a character according to claim 1,
   wherein the correcting performs correction such that the first pressed position is included in the range that is recognized as the second key.

3. The method for inputting a character according to claim 1, further comprising:
   correcting, when the distance is larger than the threshold, a range that is recognized as the first key on the basis of the first pressed position.

4. The method for inputting a character according to claim 1, further comprising:
   correcting, when the distance is larger than the threshold, the range that is recognized as the second key on the basis of the second pressed position.

5. The method for inputting a character according to claim 1, further comprising:
   setting a range in which an input of each of a plurality of keys is recognized on the basis of correspondence information in which each of the plurality of keys including the first key and the second key and reference coordinates that serve as a reference of arrangement of each of the plurality of keys in the region are associated with each other, and a distance between each pixel included in the region and the reference coordinates of each of the plurality keys.

6. The method for inputting a character according to claim 5,
wherein the correcting of the range that is recognized as the second key updates reference coordinates corresponding to the second key in the correspondence information to other reference coordinates calculated on the basis of the first pressed position.

7. An information processing apparatus that inputs a character on the basis of a pressing operation performed by a user in a region, the information processing apparatus comprising:
a memory; and
a processor coupled to the memory and configured to:
obtain a first pressed position at which the pressing operation has been performed and a first key corresponding to the first pressed position and also obtain a second pressed position at which another pressing operation has been performed and a second key corresponding to the second pressed position,
detect deletion of a character input using the first key,
determine whether or not a distance between the first pressed position and the second key is smaller than or equal to a threshold, when the deletion is detected, and
correct a range that is recognized as the second key in the region on the basis of the first pressed position in accordance with a result of a determination; and
calculate the threshold in accordance with information regarding the user, wherein
the correcting is executed on the basis of the calculated threshold, and
the calculating includes calculating the threshold on the basis of a ratio of the number of times in the past that it is determined that the distance is smaller than or equal to a past threshold to the number of pressing operations performed by the user in the past.

8. A non-transitory computer-readable recording medium storing a program for causing a computer to execute a process for inputting a character on the basis of a pressing operation performed by a user in a region, the process comprising:
obtaining a first pressed position at which the pressing operation has been performed and a first key corresponding to the first pressed position;
detecting deletion of a character input using the first key;
obtaining, when the deletion is detected, a second pressed position at which a next pressing operation has been performed and a second key corresponding to the second pressed position;
determining whether or not a distance between the first pressed position and the second key is smaller than or equal to a threshold; and
correcting, when the distance is smaller than or equal to the threshold, a range that is recognized as the second key in the region on the basis of the first pressed position; and
calculating the threshold in accordance with information regarding the user, wherein
the correcting is executed on the basis of the calculated threshold, and
the calculating includes calculating the threshold on the basis of a ratio of the number of times in the past that it is determined that the distance is smaller than or equal to a past threshold to the number of pressing operations performed by the user in the past.

* * * * *